US012427509B2

(12) United States Patent
Shishido et al.

(10) Patent No.: US 12,427,509 B2
(45) Date of Patent: Sep. 30, 2025

(54) REGENERATED DENITRATION CATALYST AND METHOD FOR MANUFACTURING THE SAME, AND DENITRATION APPARATUS

(71) Applicant: Mitsubishi Power, Ltd., Yokohama (JP)

(72) Inventors: Satoru Shishido, Kanagawa (JP); Yu Urabe, Kanagawa (JP); Takuma Kurai, Kanagawa (JP); Hiroshi Kako, Kanagawa (JP); Katsumi Nochi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1135 days.

(21) Appl. No.: 17/296,811

(22) PCT Filed: Dec. 2, 2020

(86) PCT No.: PCT/JP2020/044918
§ 371 (c)(1),
(2) Date: May 25, 2021

(87) PCT Pub. No.: WO2021/153000
PCT Pub. Date: Aug. 5, 2021

(65) Prior Publication Data
US 2022/0126280 A1    Apr. 28, 2022

(30) Foreign Application Priority Data
Jan. 31, 2020 (JP) .................. 2020-015042

(51) Int. Cl.
| | |
|---|---|
| *B01J 38/00* | (2006.01) |
| *B01D 53/86* | (2006.01) |
| *B01D 53/90* | (2006.01) |
| *B01J 21/06* | (2006.01) |
| *B01J 23/22* | (2006.01) |
| *B01J 23/28* | (2006.01) |
| *B01J 23/30* | (2006.01) |
| *B01J 37/00* | (2006.01) |
| *B01J 37/02* | (2006.01) |
| *B01J 37/04* | (2006.01) |
| *C01B 5/00* | (2006.01) |
| *C01B 21/02* | (2006.01) |

(52) U.S. Cl.
CPC .......... *B01J 38/00* (2013.01); *B01D 53/8628* (2013.01); *B01D 53/90* (2013.01); *B01J 21/063* (2013.01); *B01J 23/22* (2013.01); *B01J 23/28* (2013.01); *B01J 23/30* (2013.01); *B01J 37/0009* (2013.01); *B01J 37/0217* (2013.01); *B01J 37/04* (2013.01); *C01B 5/00* (2013.01); *C01B 21/02* (2013.01); *B01D 2251/2062* (2013.01); *B01D 2255/20707* (2013.01); *B01D 2255/20723* (2013.01); *B01D 2255/20769* (2013.01); *B01D 2255/20776* (2013.01); *B01D 2255/9022* (2013.01); *B01D 2255/9207* (2013.01); *B01D 2257/404* (2013.01)

(58) Field of Classification Search
CPC .................................. B01J 37/04; B01J 38/00
See application file for complete search history.

(56) References Cited

U.S. PATENT DOCUMENTS

| | | | | | |
|---|---|---|---|---|---|
| 4,446,250 | A | * | 5/1984 | Niwa | B01D 53/8628 502/309 |
| 4,698,321 | A | * | 10/1987 | Myerson | C10G 45/08 502/25 |
| 5,928,980 | A | * | 7/1999 | Gangwal | C10G 49/02 502/353 |
| 2006/0100089 | A1 | * | 5/2006 | Ginosar | B01J 29/7007 502/20 |
| 2007/0135300 | A1 | * | 6/2007 | Kagami | B01J 23/85 502/208 |
| 2009/0246111 | A1 | | 10/2009 | Kato et al. | |

(Continued)

FOREIGN PATENT DOCUMENTS

| | | |
|---|---|---|
| CN | 102974366 A | 3/2013 |
| CN | 105854869 A | 8/2016 |

(Continued)

OTHER PUBLICATIONS

Extended (Supplementary) European Search Report dated Oct. 26, 2022, issued in counterpart EP application No. 20916599.2. (9 pages).

(Continued)

*Primary Examiner* — Randy Boyer
(74) *Attorney, Agent, or Firm* — WHDA, LLP

(57) ABSTRACT

It is an object to provide a regenerated denitration catalyst whose denitration performance is restored compared with a denitration catalyst before use, utilizing a spent denitration catalyst, and a method for manufacturing the same. In a regenerated denitration catalyst according to the present disclosure, a spent denitration catalyst including a first titanium oxide as a main component, and a second titanium oxide are mixed. The spent denitration catalyst is already used in a denitration reaction in which nitrogen oxides in a gas are decomposed into nitrogen and water using a reducing agent. The second titanium oxide has a larger specific surface area per unit weight than the first titanium oxide. A content of the second titanium oxide based on a total weight of the first titanium oxide and the second titanium oxide is preferably 10% by weight or more and 90% by weight or less.

5 Claims, 7 Drawing Sheets

(56) References Cited

U.S. PATENT DOCUMENTS

| | | | |
|---|---|---|---|
| 2010/0105962 A1* | 4/2010 | Mamedov | ............... C01B 3/00 252/373 |
| 2011/0189069 A1 | 8/2011 | Kato et al. | |
| 2013/0065750 A1 | 3/2013 | Nochi et al. | |
| 2014/0213429 A1 | 7/2014 | Nochi et al. | |
| 2019/0015821 A1 | 1/2019 | Kaneda et al. | |

FOREIGN PATENT DOCUMENTS

| | | | |
|---|---|---|---|
| CN | 108786403 A | | 11/2018 |
| JP | 61153139 A | * | 7/1986 |
| JP | S61-153139 A | | 7/1986 |
| JP | 2004-209354 A | | 7/2004 |
| JP | 2004-209355 A | | 7/2004 |
| JP | 2005-074408 A | | 3/2005 |
| JP | 2005-087815 A | | 4/2005 |
| JP | 2013-056319 A | | 3/2013 |
| JP | 2013-180282 A | | 9/2013 |
| JP | 2018-176079 A | | 11/2018 |
| KR | 10-2013-0026034 A | | 3/2013 |
| KR | 10-2018-0113551 A | | 10/2018 |
| KR | 10-2021347 B1 | | 9/2019 |
| WO | 2008/093713 A1 | | 8/2008 |

OTHER PUBLICATIONS

Office Action dated Aug. 29, 2023, issued in counterpart JP Application No. 2020-015042, with English translation. (13 pages).

Office Action dated Nov. 14, 2023, issued in counterpart KR Application No. 10-2022-7003204, with English translation. (12 pages).

International Search Report dated Feb. 16, 2021, issued in counterpart to Application No. PCT/JP2020/044918, with English translation. (6 pages).

* cited by examiner

REGENERATED DENITRATION CATALYST AND METHOD FOR MANUFACTURING THE SAME, AND DENITRATION APPARATUS

TECHNICAL FIELD

The present disclosure relates to a regenerated denitration catalyst and a method for manufacturing the same, and a denitration apparatus.

BACKGROUND ART

Nitrogen oxides (hereinafter NOx) are included in combustion exhaust gas discharged from boilers, gas turbines, combustion furnaces, and the like. As a method for removing NOx in exhaust gas, ammonia catalytic reduction is widely known. In the ammonia catalytic reduction, a denitration reaction in which NOx is decomposed into harmless nitrogen and water is performed in the presence of a denitration catalyst using ammonia ($NH_3$) as a reducing agent.

As the denitration catalyst that promotes the denitration reaction, a catalyst containing titanium oxide as a main component is widely used. In the denitration catalyst, the denitration performance that is the reaction rate of the denitration reaction decreases during a long period of use. The decrease in denitration performance is due to wear due to exposure to combustion exhaust gas including fine powder-like substances, the coarsening of the catalyst particles due to the sintering of the catalyst itself at a denitration reaction temperature of, for example, 350° C. or more, the adhesion of catalyst poison components (alkali components, arsenic, phosphorus, and the like) and/or calcium included in combustion exhaust gas and the like. The catalyst poison components are substances that act on the catalyst to decrease its performance. The denitration catalyst whose denitration performance decreases is replaced by a new denitration catalyst, and the spent denitration catalyst is disposed of.

From the viewpoint of environmental loads and disposal treatment expenses accompanying disposal, it is desirable to reduce the disposal amount of the spent denitration catalyst. In order to decrease the disposal amount, extending the lifetime of the denitration catalyst or reusing the spent denitration catalyst is considered.

PTL 1 discloses a denitration catalyst that can be used for a longer period than conventional ones, while the increase in the $SO_2$ oxidation rate is reduced, by regulating the amounts of denitration catalyst components including Bi and $P_2O_5$.

Silicon compounds adhering to a spent denitration catalyst are inhibitors that may increase the $SO_2$ oxidation rate. In PTL 2, silicon compounds adhering to a spent denitration catalyst are removed with an alkali aqueous solution, and then the spent denitration catalyst is activated with an acid aqueous solution, and slurry catalyst components are applied on the surface of the spent denitration catalyst. Thus, the denitration performance of the spent denitration catalyst is restored while the increase in the $SO_2$ oxidation rate is controlled.

In PTL 3, a powder obtained by grinding a spent denitration catalyst is reused as part of the raw material of a new denitration catalyst.

CITATION LIST

Patent Literature

[PTL 1]
PCT International Publication No. WO 2008/093713

[PTL 2]
Japanese Unexamined Patent Application, Publication No. 2013-56319

[PTL 3]
Japanese Unexamined Patent Application, Publication No. 2004-209355

SUMMARY OF INVENTION

Technical Problem

As described above, the decrease in denitration performance occurs due to the wear of a denitration catalyst surface, the coarsening of catalyst particles due to sintering, the adhesion of catalyst poison components (alkali components, arsenic, phosphorus, and the like) and/or calcium and the like. A spent denitration catalyst has a decreased denitration performance as compared with the denitration catalyst before use. Therefore, with the adjustment of denitration catalyst components including Bi and $P_2O_5$ and the application of slurry catalyst components described in PTL 1 and PTL 2, it is difficult to restore the catalytic performance of a spent denitration catalyst whose surface area decreases due to wear. Also, mixing with the raw material of a new denitration catalyst described in PTL 3 may be insufficient for the restoration of the desired denitration performance.

The present disclosure has been made in view of such circumstances, and it is an object of the present disclosure to provide a regenerated denitration catalyst for a denitration reaction whose denitration performance is restored at the time of the regeneration of a spent denitration catalyst, compared with the spent denitration catalyst before regeneration, and a method for manufacturing the same, and a denitration apparatus.

Solution to Problem

In order to solve the above problem, the regenerated denitration catalyst for a denitration reaction and the method for manufacturing the same, and the denitration apparatus according to the present disclosure adopt the following solutions.

One aspect of the present disclosure provides a regenerated denitration catalyst for a denitration reaction in which a spent denitration catalyst including a first titanium oxide as a main component, and a second titanium oxide are mixed. The spent denitration catalyst is already used in a denitration reaction in which nitrogen oxides in a gas are decomposed into nitrogen and water using a reducing agent. The second titanium oxide has a larger specific surface area per unit weight than the first titanium oxide.

One aspect of the present disclosure provides a method for manufacturing a regenerated denitration catalyst for a denitration reaction, the method including using a mixed powder obtained by mixing a spent denitration catalyst powder including a first titanium oxide as a main component and a second titanium oxide. The spent denitration catalyst powder is already used in a denitration reaction in which nitrogen oxides in a gas are decomposed into nitrogen and water using a reducing agent. The second titanium oxide has a larger specific surface area per unit weight than the first titanium oxide.

Advantageous Effects of Invention

According to the present disclosure, a new denitration catalyst (a second titanium oxide) having a larger specific surface area than a spent denitration catalyst is used at the time of the regeneration of the spent denitration catalyst. This compensates for the surface area of the spent denitration catalyst decreased due to wear and provides a regenerated denitration catalyst whose denitration performance is restored compared with the spent denitration catalyst before regeneration.

DESCRIPTION OF EMBODIMENTS

Figure 1:
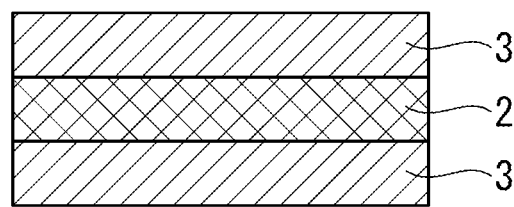
FIG. 1 is a partial longitudinal sectional view of a regenerated denitration catalyst as one example according to a first embodiment.

The present disclosure relates to a regenerated denitration catalyst for a denitration reaction and a method for manufacturing the same, and a denitration apparatus. The "regenerated denitration catalyst" is a denitration catalyst newly manufactured using as a raw material a powder derived from a spent denitration catalyst. The denitration reaction is a reaction in which nitrogen oxides in a gas are decomposed into nitrogen and water using a reducing agent.

The "spent denitration catalyst" is a denitration catalyst that is used in a facility such as a coal burning boiler with the deterioration of denitration performance and becomes a target to be replaced. The replacement criterion can be defined for each facility. The denitration catalyst used in a facility such as a coal burning boiler may be a known denitration catalyst including titanium oxide as a main component.

One embodiment of the regenerated denitration catalyst for a denitration reaction and the method for manufacturing the same, and the denitration apparatus according to the present disclosure will be described below with reference to the drawings.

First Embodiment

A regenerated denitration catalyst according to this embodiment includes a spent denitration catalyst including a first titanium oxide as a main component, and a second titanium oxide. In the regenerated denitration catalyst, the first titanium oxide included in the spent denitration catalyst and the second titanium oxide are mixed. The titanium oxide (the first titanium oxide and the second titanium oxide) may be included in the regenerated denitration catalyst, for example, in the range of 60% by weight to 85% by weight, preferably in the range of 70% by weight to 80% by weight, based on the total weight of the regenerated denitration catalyst.

The "first titanium oxide" is the after-use naming of titanium oxide that is included in a denitration catalyst before use. The "main component" refers to a component included in a target in the largest amount. The specific surface area per unit weight of the titanium oxide included in the denitration catalyst before use may be, for example, on the order of 100 $m^2/g$. The specific surface area per unit weight of the titanium oxide included in the denitration catalyst before use may be, for example, 200 $m^2/g$ or more.

The first titanium oxide has a smaller specific surface area per unit weight than the second titanium oxide. The specific surface area per unit weight of the first titanium oxide may mostly be, for example, 50 $m^2/g$ or more and less than 100 $m^2/g$. The term "mostly" indicates the specific surface areas being within a ±standard deviation of 1.5 σ, further preferably a ±standard deviation of 2 σ, from the average specific surface area when the specific surface area distribution of the first titanium oxide is assumed.

The spent denitration catalyst may include components included in known denitration catalysts. For example, the spent denitration catalyst can include active components. The active components are components including elements such as molybdenum (Mo), tungsten (W), vanadium (V), phosphorus (P), and sulfur (S). In addition to the active components, auxiliary agents such as a binder and a reinforcing material may be included in the spent denitration catalyst. Examples of the auxiliary agents include silica sols, gypsum dihydrate, aluminum sulfate, and inorganic fibers.

The second titanium oxide has a larger specific surface area per unit weight than the first titanium oxide. The specific surface area per unit weight of the second titanium oxide is mostly, for example, 200 $m^2/g$ or more and 400 $m^2/g$ or less, and further, preferably 350 $m^2/g$ or more and 400 $m^2/g$ or less in terms of improving catalytic activity. In addition, when a second titanium oxide having a larger specific surface area is used as the second titanium oxide, the surface area can be increased with the mixing of a small amount of the second titanium oxide compared with the case where the first titanium oxide is used. Therefore, the content of the first titanium oxide based on all titanium oxides can be easily increased. In other words, the amount of the spent catalyst that can be regenerated can be easily increased. The term "mostly" indicates the specific surface areas being within a ±standard deviation of 1.5 σ, further preferably a ±standard deviation of 2 σ, from the average specific surface area when the specific surface area distribution of the second titanium oxide is assumed. The second titanium oxide has a large specific surface area per unit weight and therefore has higher denitration performance than the first titanium oxide.

The content of the second titanium oxide based on all titanium oxides in the regenerated denitration catalyst is selected in the range of 10% by weight or more and 90% by weight or less. The second titanium oxide is brittle compared with the first titanium oxide. Thus, from the viewpoint of the improvement of the strength of the denitration catalyst, the content of the second titanium oxide is preferably selected within the range of 25% by weight or more and 50% by weight or less. Here, the total weight of the first titanium oxide and the second titanium oxide (the weight of all titanium oxides) is 100% by weight.

The regenerated denitration catalyst may include a predetermined amount of phosphorus or a phosphorus containing compound (phosphorus compound).

The regenerated denitration catalyst may include vanadium or a vanadium containing compound (vanadium compound, for example, vanadium pentoxide ($V_2O_5$)). The content of vanadium or the vanadium compound is preferably 4% by weight or less based on the total weight of the regenerated denitration catalyst.

The regenerated denitration catalyst may include, for example, tungsten (including a tungsten compound), aluminum (including an aluminum compound, for example, aluminum oxide), or silicon (including a silicon compound, for example, silicon dioxide).

FIG. 1 illustrates a partial longitudinal section of a regenerated denitration catalyst. As shown in FIG. 1, a regenerated denitration catalyst 1 may include a plate-like substrate 2 and catalyst layers 3 supported on the plate-like substrate 2.

The plate-like substrate 2 may be an object having a structure in which the supported catalyst layers 3 are less likely to peel off. The examples of the plate-like substrate 2 include an object in which a plurality of holes are provided on an entire plate face, such as a metal lath or a punched metal, an object in which small asperity is provided on a surface, such as a blast-treated plate, and an object shaped in the form of a plate using line materials, such as a nonwoven fabric or a wire net.

The plate-like substrate 2 is preferably composed of a material having heat resistance, such as stainless steel, glass, or ceramic. In this embodiment, a metal lath made of stainless steel is preferably used as the plate-like substrate 2.

Figure 2:
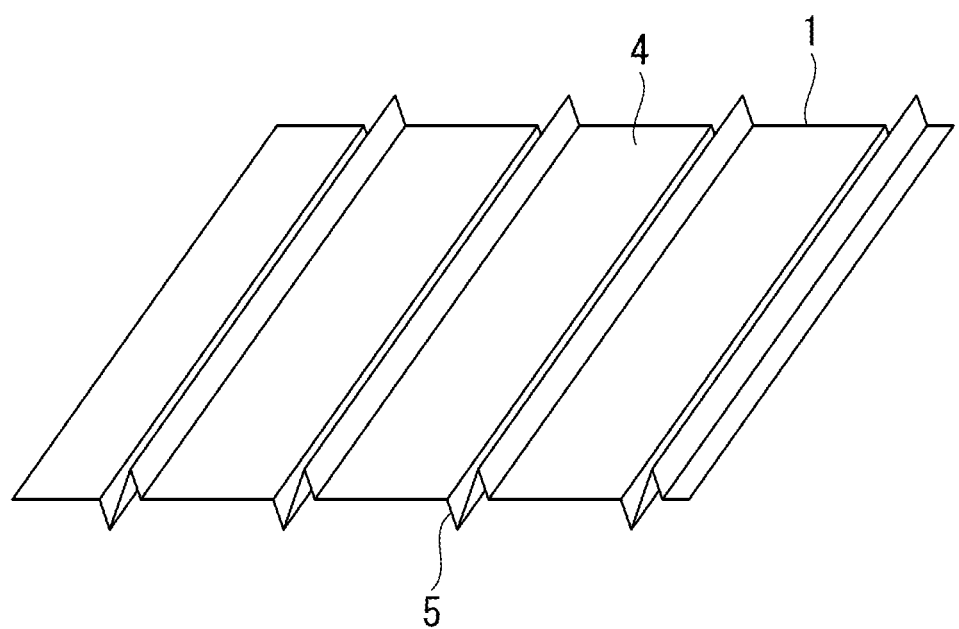
FIG. 2 is a perspective view of a plate-like regenerated denitration catalyst.
Figure 3:
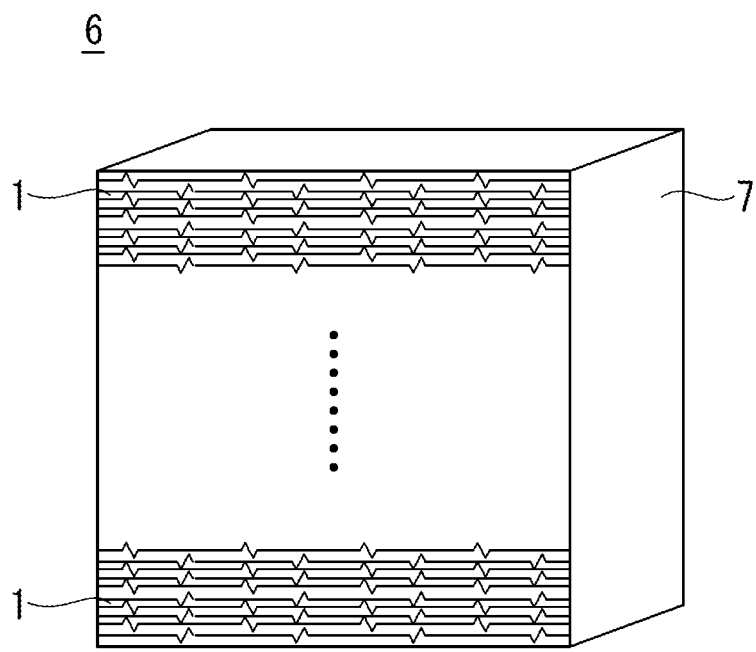
FIG. 3 is a schematic view of a catalyst unit including plate-like regenerated denitration catalysts.

FIG. 2 illustrates a perspective view of a plate-like regenerated denitration catalyst. FIG. 3 illustrates a catalyst unit including plate-like regenerated denitration catalysts.

In FIG. 2, a regenerated denitration catalyst 1 (a plate-like substrate 2 included in the regenerated denitration catalyst 1) has flat portions 4 and line spacer portions 5. The flat portions 4 and the line spacer portions 5 are alternately disposed. The plate-like substrate 2 can be manufactured from a flat raw plate. The line spacer portions 5 can be formed, for example, by the press bending processing or the like of the flat raw plate.

The catalyst layer 3 is a layer including the first titanium oxide of a spent denitration catalyst and a second titanium oxide having a larger specific surface area per unit weight than the first titanium oxide. The catalyst layer 3 may include tungsten (including a tungsten compound), aluminum (including an aluminum compound, for example, aluminum oxide), and silicon (including a silicon compound, for example, silicon dioxide). The catalyst layer 3 may include molybdenum, or glass fibers. In FIG. 1, the catalyst layers 3 are supported on both surfaces of the plate-like substrate 2.

The catalyst unit 6 in FIG. 3 is obtained by housing a plurality of plate-like regenerated denitration catalysts 1 in a unit frame 7. In the catalyst unit 6, the plate-like regenerated denitration catalysts 1 are superposed so that on the flat portions 4 of any plate-like regenerated denitration catalyst 1, the line spacer portions 5 of neighboring another plate-like regenerated denitration catalyst 1 abut.

Figure 4:
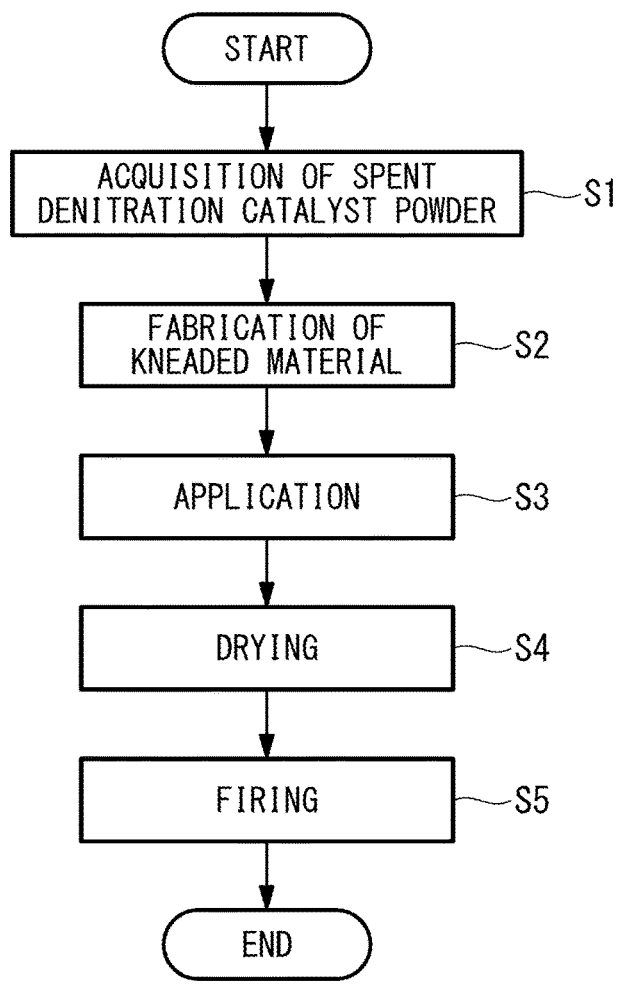
FIG. 4 is a flow diagram showing a process for manufacturing a regenerated denitration catalyst according to the first embodiment.

Next, a method for manufacturing a regenerated denitration catalyst according to this embodiment will be described. FIG. 4 shows a flow diagram of the manufacturing process.

The manufacturing method according to this embodiment includes (S1) the acquisition of a spent denitration catalyst powder, (S2) the fabrication of a kneaded material, (S3) application, (S4) drying, and (S5) firing.

(S1) Acquisition of Spent Denitration Catalyst Powder

A spent denitration catalyst powder is obtained from a spent denitration catalyst including a first titanium oxide. A spent denitration catalyst powder already ground may be procured.

For the spent denitration catalyst, one in the form of including no substrate is preferably used. The "substrate" is a metal plate or a wire net of stainless steel or the like. For the spent denitration catalyst, a denitration catalyst composed of only denitration catalyst components is preferably used. The "denitration catalyst components" are a main component that functions as a catalyst for a denitration reaction, an active component that activates the denitration reaction, an auxiliary agent, and the like.

For example, a denitration catalyst of honeycomb structure is in the form of including no substrate and is obtained by extruding denitration catalyst components. With the denitration catalyst in the form of including no substrate, a spent denitration catalyst powder can be obtained by removing impurities such as oil and sulfur adhering to the surface of the denitration catalyst of honeycomb structure by cleaning treatment and then grinding the denitration catalyst, or grinding the denitration catalyst as it is.

The grinding can be performed by a method using a hammer mill, a roller mill, a ball mill, an air flow grinder, and the like.

The particle size of the spent denitration catalyst powder is preferably a threshold or less. The threshold is any value in the range of 0.1 mm or more and 1.0 mm or less. The particle size of the spent denitration catalyst powder is preferably smaller because dust adhering to the spent denitration catalyst and the catalyst powder are more likely to separate from each other. The particle size of the spent denitration catalyst powder is preferably 0.1 mm or less. When the particle size is larger than 1.0 mm, the dust and the catalyst powder are less likely to separate from each other, and the performance of the spent denitration catalyst powder lowers. This may decrease the strength of the regenerated denitration catalyst obtained after firing.

(S2) Fabrication of Kneaded Material

A second titanium oxide or a secondary denitration catalyst powder including the second titanium oxide is added to the spent denitration catalyst powder and mixed. The second titanium oxide has a larger specific surface area per unit weight than the first titanium oxide. The secondary denitration catalyst powder may include molybdenum, or glass fibers. The secondary denitration catalyst powder may include tungsten (including a tungsten compound), aluminum (including an aluminum compound, for example, aluminum oxide), and silicon (including a silicon compound, for example, silicon dioxide).

The second titanium oxide or the second titanium oxide included in the secondary denitration catalyst powder may be added so as to be 10% by weight or more and 90% by weight or less, preferably 25% by weight or more and 50% by weight or less, based on the total weight of the first titanium oxide included in the spent denitration catalyst powder and the second titanium oxide.

Figure 8:
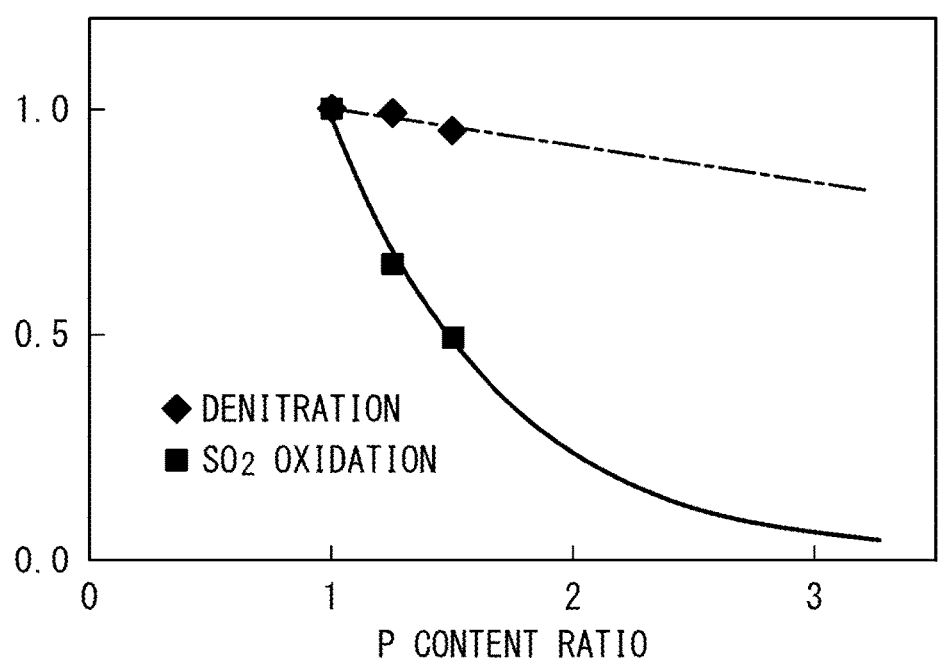
FIG. 8 is a diagram showing the relationships between the addition of phosphorus and the denitration performance and $SO_2$ oxidation of a regenerated denitration catalyst.
Figure 9:
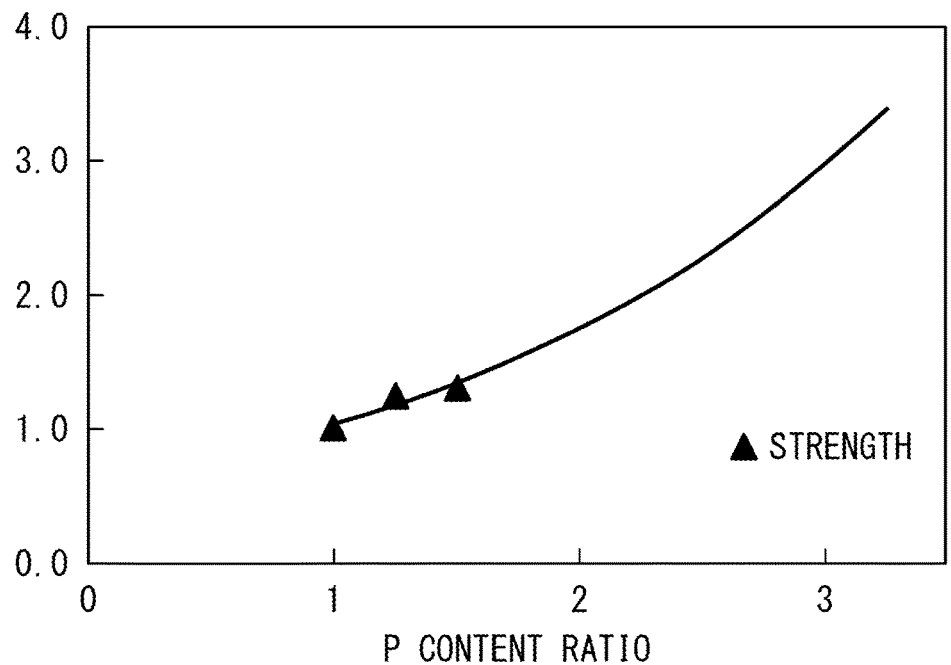
FIG. 9 is a diagram showing the relationship between the addition of phosphorus and the strength of a regenerated denitration catalyst.

Phosphorus or a phosphorus compound is preferably further added to the mixed powder in which the spent denitration catalyst powder and the second titanium oxide or the secondary denitration catalyst powder including the second titanium oxide are mixed. As shown in FIG. 8 and FIG. 9 described later, when the amount of phosphorus added is increased, the $SO_2$ oxidation rate of the regenerated denitration catalyst tends to reduce, and the strength of the regenerated denitration catalyst tends to improve. For the amount of phosphorus (or the phosphorus compound) added, any amount may be selected so that the desired effect is obtained. A catalytically active component such as vanadium (including a vanadium compound) may be further added to the mixed powder. The amount of vanadium added may be set so that more than 0% by weight and 4% by weight or less of vanadium (including a vanadium compound) is included based on the total amount of the mixed powder.

A solvent such as water is added to the mixed powder, and the mixture is kneaded. When the amount of the solvent is large, the kneaded material is pasty. When the amount of the solvent is small, the kneaded material is slurry.

(S3) Application

A paste of the kneaded material is applied on a plate-like substrate. (When the kneaded material is slurry, the "application" means impregnating a plate-like substrate.) The thickness of the applied kneaded material may be 0.5 mm or more and 1.0 mm or less. "The thickness of the kneaded material" is the average of the distance from the surface of the plate-like substrate to the outer surface of the applied kneaded material.

(S4) Drying

The plate-like substrate on which the kneaded material is applied is dried. The kneaded material, for example, can be air-dried by standing at ordinary temperature.

(S5) Firing

After the drying, the dried material is fired under an inert gas atmosphere at a high temperature of 300° C. or more.

In the above (S1), cleaning treatment such as water cleaning or chemical solution cleaning may be carried out on the spent denitration catalyst by a known method before grinding.

Second Embodiment

Figure 5:
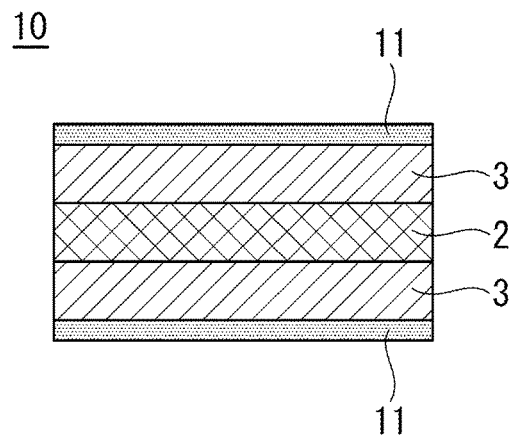
FIG. 5 is a partial longitudinal sectional view of a regenerated denitration catalyst as one example according to a second embodiment.

FIG. 5 illustrates a partial section of a regenerated denitration catalyst according to this embodiment. In the regenerated denitration catalyst 10 according to this embodiment, on the surfaces of the catalyst layers 3 of the first embodiment, active layers 11 that activate the catalyst layers 3 are provided. The active layer 11 includes vanadium (including a vanadium compound) and at least one of tungsten (including a tungsten compound) or molybdenum (including a molybdenum compound).

Figure 6:
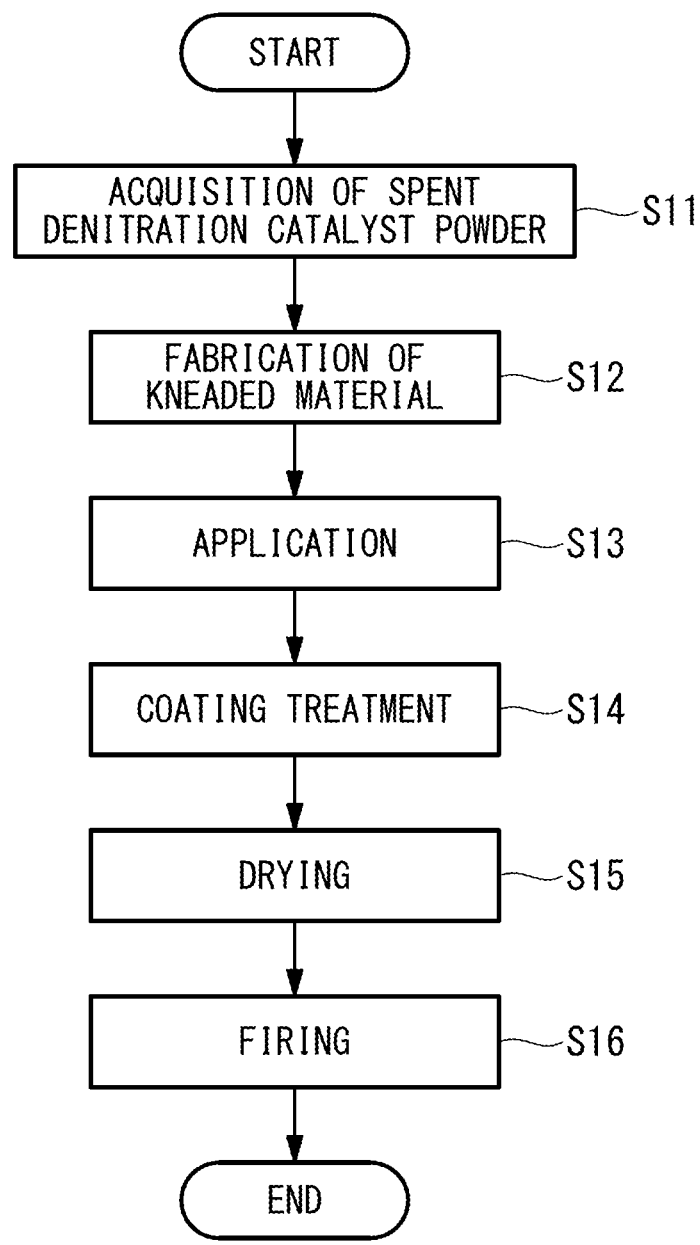
FIG. 6 is a flow diagram showing a process for manufacturing a regenerated denitration catalyst according to the second embodiment.

FIG. 6 shows a flow diagram of a manufacturing process according to this embodiment. The manufacturing method according to this embodiment includes (S11) the acquisition of a spent denitration catalyst powder, (S12) the fabrication of a kneaded material, (S13) application, (S14) coating treatment, (S15) drying, and (S16) firing.

The above (S11) to (S13), (S15), and (S16) are steps similar to the (S1) to (S5) of the first embodiment, and therefore description is omitted.

(S14) Coating Treatment

The kneaded material applied on the plate-like substrate is coated with vanadium (including a vanadium compound) and at least one of molybdenum (including a molybdenum compound) or tungsten (including a tungsten compound).

The coating thickness may be 10 μm or more and 400 μm or less. When the coating thickness is less than 10 μm, the effect of catalytic activity cannot be sufficiently obtained. Even if the coating thickness is more than 400 μm, the effect of catalytic activity cannot be further increased, and the denitration performance of the catalyst layer including the first titanium oxide and the second titanium oxide decreases.

For example, when the desired coating thickness is not obtained by one coating treatment, coating treatment may be performed a plurality of times.

Vanadium (including a vanadium compound) and at least one of molybdenum (including a molybdenum compound) or tungsten (including a tungsten compound) are mixed and adjusted in the form of a slurry. The plate-like substrate to which the kneaded material applies is immersed in the slurry to coat the surface.

Next, the actions and effects of the content of the second titanium oxide and the addition of phosphorus, vanadium, and the like will be described.

(Content of Second Titanium Oxide)

Regenerated denitration catalysts were manufactured with titanium oxide ($TiO_2$), vanadium pentoxide ($V_2O_5$), phosphorus, and the like according to the first embodiment. For the spent denitration catalyst, the secondary denitration catalyst powder, and the plate-like substrate, the following were used.

Spent Denitration Catalyst:
  $TiO_2$ (first titanium oxide) about 75 wt %, $V_2O_5$ about 0.5 wt %, others about 24.5 wt %
  specific surface area of $TiO_2$ (first titanium oxide) 50 $m^2$/g to 80 $m^2$/g
  honeycomb shape Secondary Denitration Catalyst Powder:
  $TiO_2$ (second titanium oxide) about 80 wt %, others 20 wt %
  specific surface area of $TiO_2$ (second titanium oxide) 200 $m^2$/g to 300 $m^2$/g Plate-Like Substrate:
  made of stainless steel (plate thickness 0.5 mm to 1.0 mm)
  Phosphorus: (any amount)
Vanadium ($V_2O_5$): (0.5 wt % to 3.0 wt %)

The spent catalyst of honeycomb structure was ground to a particle size of 0.1 mm or less to obtain a spent denitration catalyst powder. The secondary denitration catalyst powder, phosphorus, and vanadium were added to the spent denitration catalyst powder to obtain a mixed powder. The amount of the second titanium oxide (high specific surface area $TiO_2$) added in the mixed powder was set so that the content of the high specific surface area $TiO_2$ in all $TiO_2$ was a predetermined weight (wt) %. The amounts of vanadium ($V_2O_5$) and phosphorus added in the mixed powder were kept constant. Vanadium pentoxide ($V_2O_5$) was used as the vanadium, but the same amount of a vanadium simple substance or another vanadium compound including the same amount of vanadium as that of the vanadium included in the vanadium pentoxide used may be used.

The mixed powder was kneaded with water to fabricate a pasty kneaded material. The kneaded material was applied (with a thickness of 0.5 mm to 1.0 mm) to the surface of the plate-like substrate and then air-dried at ordinary temperature. Subsequently, the dried material was fired under an inert gas atmosphere at a high temperature of 300° C. or more to obtain a regenerated denitration catalyst.

Figure 7:
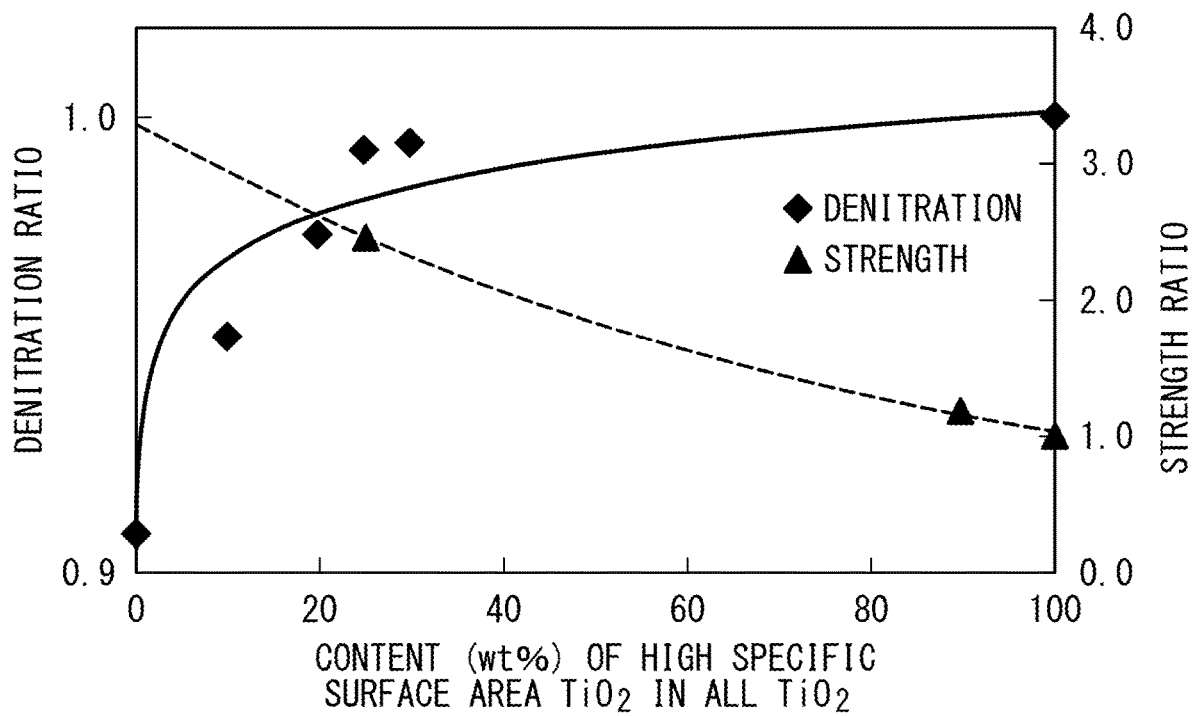
FIG. 7 is a diagram showing the relationship between high specific surface area $TiO_2$ content and denitration performance and the relationship between high specific surface area $TiO_2$ content and strength.

In FIG. 7, the relationship between second titanium oxide (high specific surface area $TiO_2$) content and denitration performance is shown by a solid line, and the relationship between second titanium oxide (high specific surface area $TiO_2$) content and the strength of wear resistance is shown by a broken line. In the same figure, the horizontal axis shows the content (wt %) of the high specific surface area $TiO_2$ in all $TiO_2$ included in the mixed powder, the vertical axis (left) shows denitration performance by a denitration ratio, and the vertical axis (right) shows the strength of wear resistance of the denitration catalyst by a strength ratio. In FIG. 7, the denitration ratio and the strength ratio are standard values that represent, by ratios, differences from the case where the content of the high specific surface area $TiO_2$ is 100 wt % (in a new denitration catalyst), and the denitration performance (denitration rate) and strength of wear resistance of the new denitration catalyst are 1.

According to FIG. 7, as the content of the high specific surface area $TiO_2$ rises, the denitration performance improves. By containing 10 wt % or more of the high specific surface area $TiO_2$, it is possible to obtain a denitration performance of 95% or more of that of the denitration catalyst in which the content of the high specific surface area $TiO_2$ is 100 wt % (in a new denitration catalyst). Further, when 25 wt % or more of the high specific surface area $TiO_2$ is contained, the denitration performance is 98% or more of that of the denitration catalyst in which the content of the high specific surface area $TiO_2$ is 100 wt % (in a new denitration catalyst).

On the other hand, according to FIG. 7, as the content of the high specific surface area $TiO_2$ rises, the strength of wear resistance decreases. From this, it is suggested that the amount of the high specific surface area $TiO_2$ added may be set considering the balance of the denitration performance and the strength of wear resistance.

According to the viewpoint of ensuring the strength of wear resistance, the content of the high specific surface area $TiO_2$ is preferably not more than 90 wt %. According to a viewpoint of the reuse of the spent denitration catalyst, the content of the high specific surface area $TiO_2$ is preferably 50 wt % or less. When a solid such as combustion ash is included in exhaust gas, the content of the high specific surface area $TiO_2$ is preferably 50 wt % or less in order to ensure higher strength of wear resistance.

From the above, it is preferred that the content of the high specific surface area $TiO_2$ is 10 wt % or more and 90 wt % or less, preferably 25 wt % or more and 50 wt % or less. The content of the high specific surface area $TiO_2$ may be set within the above range so as to satisfy the state of decrease in the denitration performance of the spent denitration catalyst, and the denitration performance and the strength of wear resistance required in a facility in which the regenerated denitration catalyst is used.

(Addition of Phosphorus)

Regenerated denitration catalysts were manufactured according to the first embodiment, and the influence of the addition of phosphorus was evaluated.

Spent Denitration Catalyst:
  $TiO_2$ (first titanium oxide) about 75 wt %, $V_2O_5$ about 0.5 wt %, others 24.5 wt %
  specific surface area of $TiO_2$ (first titanium oxide) 50 $m^2$/g to 80 $m^2$/g
  honeycomb shape Secondary Denitration Catalyst Powder:
  $TiO_2$ (second titanium oxide) about 80 wt %, others 20 wt %
  specific surface area of $TiO_2$ (second titanium oxide) 200 $m^2$/g to 300 $m^2$/g
Plate-Like Substrate:
  made of stainless steel (plate thickness 0.5 mm to 1.0 mm)
    Phosphorus: (any amount)
Vanadium ($V_2O_5$): (0.5 wt % to 3.0 wt %)

The spent catalyst of honeycomb structure was ground to a particle size of 0.1 mm or less to obtain a spent denitration catalyst powder. The secondary denitration catalyst powder, phosphorus, and vanadium were added to the spent denitration catalyst powder to obtain a mixed powder. The amount of the second titanium oxide (high specific surface area $TiO_2$) and vanadium added in the mixed powder were kept constant. The amounts of phosphorus added in the mixed powder was varied.

The mixed powder was kneaded with water to fabricate a pasty kneaded material. The kneaded material was applied (with a thickness of 0.5 mm to 1.0 mm) to the surface of the plate-like substrate and then air-dried at ordinary temperature. Subsequently, the dried material was fired under an inert gas atmosphere at a high temperature of 300° C. or more to obtain a regenerated denitration catalyst.

In FIG. 8, the relationship between the addition of phosphorus and the denitration performance of the regenerated denitration catalyst is shown by a dashed dotted line, and the relationship between the addition of phosphorus and the $SO_2$ oxidation rate is shown by a solid line. In the same figure, the horizontal axis is the phosphorus (P) content ratio, and the vertical axis is the change ratio. The change ratio is a standard value that represents, by a ratio, a difference from the case where any amount of phosphorus is added to a regenerated denitration catalyst, and the denitration rate and $SO_2$ oxidation rate of the regenerated denitration catalyst are 1.

In some facilities (boilers and the like) to which regenerated denitration catalysts are applied, coal, C heavy oil, or the like having high sulfur content is utilized as a fuel. Sulfur dioxide ($SO_2$) is included in exhaust gas produced by combusting these fuels.

When exhaust gas in which $SO_2$ is included is treated by ammonia catalytic reduction, an oxidation reaction from $SO_2$ to $SO_3$ occurs simultaneously with a reaction in which NOx is reduced and removed. The increase in $SO_3$ can be a factor of the corrosion and clogging of portions in contact with exhaust gas in various apparatuses such as a heat exchanger disposed downstream. Therefore, it is desirable to control the progress of the oxidation reaction from $SO_2$ to $SO_3$.

In FIG. 9, the relationship between the amount of phosphorus added and the strength of wear resistance of the regenerated denitration catalyst is shown by a solid line. In the same figure, the horizontal axis is the phosphorus (P) content ratio, and the vertical axis is the change ratio. The change ratio is a standard value that represents, by a ratio, a difference from the case where any amount of phosphorus is added to a regenerated denitration catalyst, and the strength of wear resistance of the regenerated denitration catalyst is 1.

According to FIG. 8, as a larger amount of phosphorus is included, the denitration performance and the $SO_2$ oxidation rate decrease. According to FIG. 9, as a larger amount of phosphorus is included, the strength of wear resistance improves.

In the regenerated denitration catalyst, the $SO_2$ oxidation rate is preferably lower, while the denitration performance and the strength of wear resistance is preferably be higher. According to FIGS. 8 and 9, it is suggested that the amount of phosphorus added ought to be set considering the balance of the denitration performance, the $SO_2$ oxidation rate, and the strength of wear resistance.

According to the diligent study of the present inventors, it is confirmed that by adjusting the amount of phosphorus added in the regenerated denitration catalyst, the required denitration performance and strength of wear resistance can be ensured while an increase in the $SO_2$ oxidation rate is controlled.

(Addition of Vanadium)

Regenerated denitration catalysts were manufactured according to the first embodiment, and the influence of the addition of vanadium (including a vanadium compound, vanadium compound: $V_2O_5$ in this embodiment) was evaluated.

Spent Denitration Catalyst:
  $TiO_2$ (first titanium oxide) about 75 wt %, $V_2O_5$ about 0.5 wt %, others 24.5 wt %
  specific surface area of $TiO_2$ (first titanium oxide) 50 $m^2/g$ to 80 $m^2/g$
  honeycomb shape Secondary Denitration Catalyst Powder:
  $TiO_2$ (second titanium oxide) about 80 wt %, others 20 wt %
  specific surface area of $TiO_2$ (second titanium oxide) 200 $m^2/g$ to 300 $m^2/g$ Plate-Like Substrate:
  made of stainless steel (plate thickness 0.5 mm to 1.0 mm)
    Phosphorus: (any amount)

Vanadium ($V_2O_5$): (0.5 wt % to 3.0 wt %)

The spent catalyst of honeycomb structure was ground to a particle size of 0.1 mm or less to obtain a spent denitration catalyst powder. The secondary denitration catalyst powder, phosphorus, and vanadium ($V_2O_5$) were added to the spent denitration catalyst powder to obtain a mixed powder. The amounts of the second titanium oxide (high specific surface area $TiO_2$) and phosphorus added in the mixed powder were kept constant. The amount of vanadium ($V_2O_5$) added to the mixed powder was changed.

The mixed powder was kneaded with water to fabricate a pasty kneaded material. The kneaded material was applied (with a thickness of 0.5 mm to 1.0 mm) to the surface of the plate-like substrate and then air-dried at ordinary temperature. Subsequently, the dried material was fired under an inert atmosphere at a high temperature of 300° C. to obtain a regenerated denitration catalyst.

Figure 10:
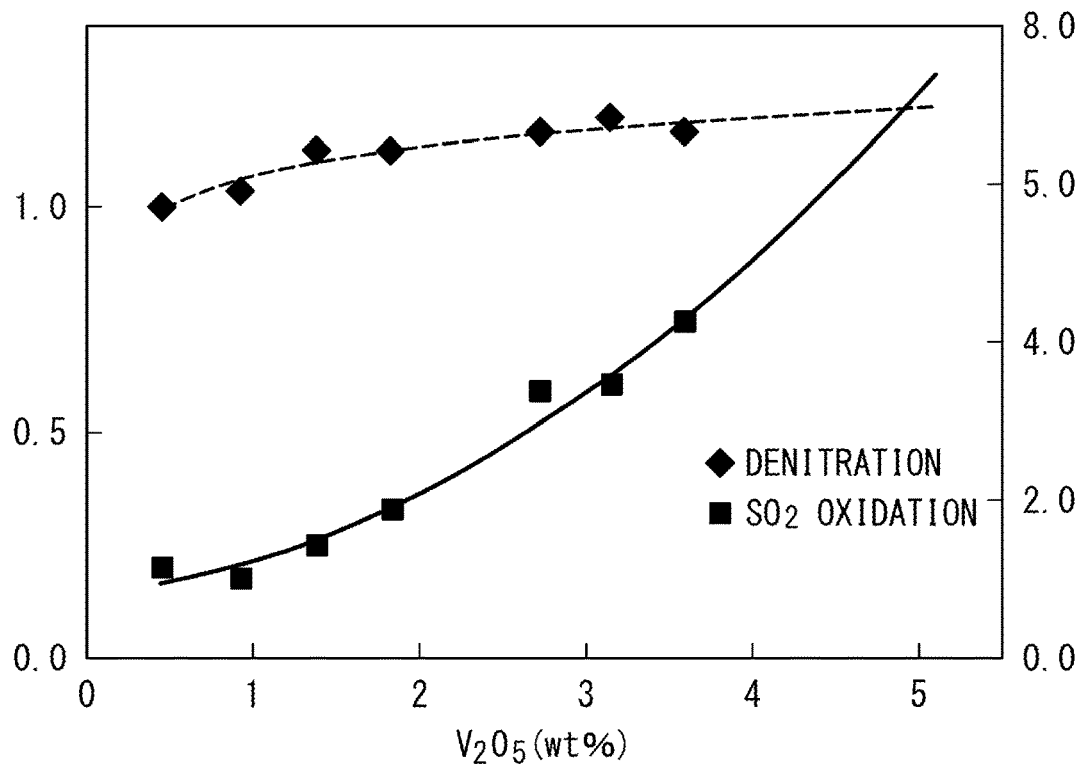
FIG. 10 is a diagram showing the relationships between the addition of a vanadium compound and the denitration performance and $SO_2$ oxidation of a regenerated denitration catalyst.

FIG. 10 shows the relationships between the addition of the vanadium compound (for example, vanadium pentoxide ($V_2O_5$)) and the denitration performance (broken line) and $SO_2$ oxidation rate (solid line) of the regenerated denitration catalyst. In the same figure, the horizontal axis is $V_2O_5$ (wt %) in the total weight of the regenerated denitration catalyst, and the vertical axes are change ratios. The change ratio of denitration is a standard value that represents, by a ratio, a difference from the case where the denitration rate with 0.5 wt % of $V_2O_5$ is 1. The change ratio of $SO_2$ oxidation is a standard value that represents, by a ratio, a difference from the case where the $SO_2$ oxidation rate with 0.5 wt % of $V_2O_5$ is 1.

According to FIG. 10, when the content of $V_2O_5$ increases, the denitration performance and the $SO_2$ oxidation rate show an increasing tendency. Thus, it is confirmed that the addition of $V_2O_5$ can improve the denitration performance, while increasing the $SO_2$ oxidation rate. According to the diligent study of the present inventors, the obtained result is that the content of vanadium in the catalyst layer is preferably 4 wt % or less. Further preferably, the content of vanadium in the catalyst layer is 3 wt % or less, at which the amount of improvement of the denitration performance per unit amount is large. Even if the content of vanadium is increased to more than 4 wt %, the $SO_2$ oxidation rate increases significantly almost without the denitration performance improving, which is not preferred.

Figure 11:
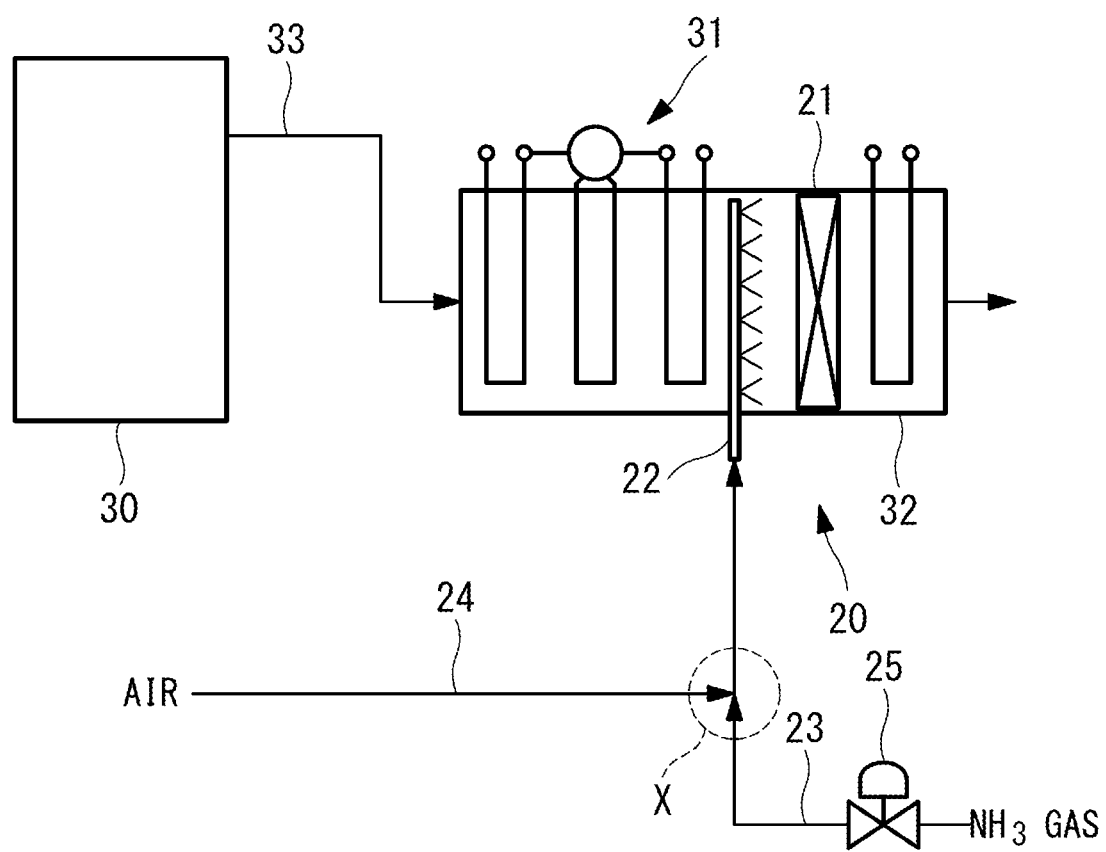
FIG. 11 is a schematic view showing the principal portion of a combustion gas generation apparatus including the denitration apparatus of one Example according to several embodiments of the present disclosure.

A denitration apparatus 20 in which the regenerated denitration catalyst of one Example according to several embodiments of the present disclosure is adopted will be described below. FIG. 11 shows the denitration apparatus 20 including the regenerated denitration catalyst according to one Example, and its peripheral equipment.

In FIG. 11, the denitration apparatus 20 is placed in a duct 32 that is a path through which combustion gas produced in a combustion gas production apparatus 30 described later passes as exhaust gas after undergoing heat exchange with a medium circulating through a heat exchanger 31. Thus, the denitration apparatus 20 is placed on the downstream side of the heat exchanger 31 in the combustion gas flow in the duct 32.

The combustion gas production apparatus 30 is an apparatus that produces combustion gas including nitrogen oxides by combusting a fuel for combustion. Examples of the combustion gas production apparatus 30 includes a boiler, a gas turbine, and a combustion furnace.

A combustion gas discharge line 33 through which the combustion gas (exhaust gas) discharged from the combustion gas production apparatus 30 is guided is connected to the duct 32. In the duct 32, the heat exchanger 31 and the denitration apparatus 20 are disposed in order from the upstream side (the left side shown in FIG. 11) of the exhaust gas flow. In the duct 32, another heat exchanger may be further provided on the downstream side of the exhaust gas flow.

The heat exchanger 31 produces steam by performing heat exchange between the medium (feedwater or steam) supplied inside and the combustion gas from the combustion gas production apparatus 30. The combustion gas passing through the duct 32 is heat-exchanged by the heat exchanger 31, and then the harmful substances (nitrogen oxides) included in the combustion gas are removed by the denitration apparatus 20, and the combustion gas is purified, and heat is recovered. The exhaust gas whose temperature decreases is released to the air from a chimney (illustration is omitted) connected to the downstream side of the denitration apparatus 20 in the exhaust gas flow.

Next, the denitration apparatus 20 according to this embodiment will be described.

The denitration apparatus 20 shown in FIG. 11 includes an ammonia injection apparatus 22 and a regenerated denitration catalyst 21 in order from the upstream side of the combustion gas flow. The denitration apparatus 20 is placed inside the duct 32 and has a structure in which the combustion gas passes through the regenerated denitration catalyst 21.

An ammonia gas line 23 that supplies ammonia gas, and a dilution air supply line 24 that supplies air (dilution air) for diluting ammonia gas to a concentration suitable for a denitration reaction are connected to the ammonia injection apparatus 22. A valve 25 is placed in the ammonia gas line 23, and the flow rate of ammonia gas can be regulated.

The dilution air supply line 24 and the ammonia gas line 23 join in a joining portion X. Dilution air supplied by the dilution air supply line 24 and ammonia gas supplied by the ammonia gas line 23 are mixed in the joining portion X to form an ammonia mixed gas, and the ammonia mixed gas is supplied to the ammonia injection apparatus 22.

The ammonia mixed gas is sprayed into the duct 32 by being jetted from the nozzles (illustration is omitted) of the ammonia injection apparatus 22. The sprayed ammonia mixed gas is mixed with the combustion gas circulating through the duct 32 and passes through the regenerated denitration catalyst 21 placed on the downstream side of the ammonia injection apparatus 22.

For the removal of the harmful substances (nitrogen oxides), Selective Catalytic Reduction (SCR) is used. The combustion gas mixed with the ammonia mixed gas passes through the regenerated denitration catalyst 21, and thus the nitrogen oxides (NOx) in the combustion gas are decomposed into nitrogen and water vapor free from environmental loads by a chemical reaction.

APPENDIX

The regenerated denitration catalysts and the methods for manufacturing the same described in the embodiments described above are considered, for example, as follows.

In the regenerated denitration catalyst according to the present disclosure, a spent denitration catalyst including a first titanium oxide as a main component, and a second titanium are mixed. The spent denitration catalyst is already used in a denitration reaction in which nitrogen oxides in a gas are decomposed into nitrogen and water using a reducing agent. The second titanium oxide has a larger specific surface area per unit weight than the first titanium oxide.

For the first titanium oxide included in the denitration catalyst, the catalyst particles coarsen due to sintering and the like during use in a denitration reaction at a denitration reaction temperature of, for example, 350° C. or more, and the denitration performance decreases as compared before use. The second titanium oxide has a large specific surface area per unit weight, and therefore has higher denitration performance than the first titanium oxide. The mixed second titanium oxide compensates for the decrease in the denitration performance of the first titanium oxide, and the denitration performance can be restored as the regenerated denitration catalyst.

In one aspect of the above disclosure, the content of the second titanium oxide based on the total weight of the first titanium oxide and the second titanium oxide is 10% by weight or more and 90% by weight or less, preferably 25% by weight or more and 50% by weight or less.

By including 10% by weight or more of the second titanium oxide, a denitration performance of 95% or more of that of a new denitration catalyst manufactured from only the second titanium oxide (the first titanium oxide not being used) can be obtained for the regenerated denitration catalyst. When 25% by weight or more of the second titanium oxide is included, the obtained denitration performance is 98% or more of that of a new denitration catalyst manufactured from only the second titanium oxide (the first titanium oxide not being used).

In order to manufacture a denitration catalyst using titanium oxide having a large specific surface area per unit weight, a large amount of a solvent needs to be added in the manufacturing process. When a large amount of a solvent is added, the regenerated denitration catalyst obtained after firing has a porous structure. When a large amount of pores are included, the strength of wear resistance decreases. Thus, when the content of the second titanium oxide is too high, there is a possibility that the catalyst strength decreases. Specifically, when the content of the second titanium oxide is more than 90%, there is a possibility that the catalyst strength decreases. In the above disclosure, the content of the second titanium oxide is preferably 50% by weight or less. Thus, sufficient denitration performance can be ensured while the strength of wear resistance is maintained.

When the reuse rate of the spent denitration catalyst is higher, the manufacturing cost and the disposal cost are kept low. The content of the spent denitration catalyst and the content of the second titanium oxide are in a trade-off relationship, and therefore when the content of the second titanium oxide increases, the content of the spent denitration catalyst decreases, and the reuse rate of the spent denitration catalyst decreases. Therefore, the amount of the second titanium oxide added is preferably smaller. In the above disclosure, by setting the content of the second titanium oxide at 90% by weight or less, preferably 50% by weight or less, a large amount of the spent denitration catalyst can be recycled, and therefore the manufacturing cost and the disposal cost can be kept low.

In one aspect of the above disclosure, the regenerated denitration catalyst may include the above predetermined amount of phosphorus or a phosphorus containing compound.

By including phosphorus or a phosphorus containing compound, the catalyst strength can be improved. This can compensate for the decrease in the strength of wear resistance which is caused by the second titanium oxide having a large specific surface area.

By including phosphorus or a phosphorus containing compound, an increase in the $SO_2$ oxidation rate can be controlled.

In one aspect of the above disclosure, it is desirable that the spent denitration catalyst is derived from a denitration catalyst of honeycomb structure.

A denitration catalyst of plate-like structure includes a substrate inside the catalyst. The substrate is a metal plate, a wire net, or the like, and it is difficult to grind the substance as it is. Even if grinding is carried out, it is also difficult to recover catalyst components such as vanadium from the metal plate surface. On the other hand, the denitration catalyst of honeycomb structure is a shaped body consisting of only denitration catalyst components. With the denitration catalyst of honeycomb structure including no substrate such as a metal plate, a material of a regenerated denitration catalyst is easily obtained by removing impurities such as adhering materials on the surface of the denitration catalyst of honeycomb structure by cleaning treatment and then grinding the denitration catalyst, or grinding the denitration catalyst as it is.

In one aspect of the above disclosure, the regenerated denitration catalyst includes a plate-like substrate (2) and a catalyst layer (3) supported on the plate-like substrate, and the spent denitration catalyst and the second titanium oxide can be included in the catalyst layer.

In the regenerated denitration catalyst in one aspect of the above disclosure, the shape is mostly maintained by the substrate. Thus, the criterion of shapability required of the catalyst layer is loose compared with the denitration catalyst of honeycomb structure including no substrate, and therefore the flexibility of material adjustment increases. Further, the plate-like substrate has a simpler structure than a honeycomb structure, and therefore the application of a kneaded material is easy, and the manufacturing process is simplified.

In one aspect of the above disclosure, an active layer (11) is provided on the surface of the catalyst layer, and the active layer may include vanadium and at least one of molybdenum or tungsten.

By disposing vanadium and at least one of molybdenum or tungsten on the surface, the denitration performance can be improved.

The method for manufacturing a regenerated denitration catalyst according to the present disclosure includes using a mixed powder obtained by mixing a spent denitration catalyst powder including a first titanium oxide as a main component and a second titanium oxide. The spent denitration catalyst powder is already used in a denitration reaction in which nitrogen oxides in a gas are decomposed into nitrogen and water using a reducing agent. The second titanium oxide has a larger specific surface area per unit weight than the first titanium oxide (S2).

In one aspect of the above disclosure, 10% by weight or more and 90% by weight or less of the second titanium oxide may be mixed based on the total weight of the first titanium oxide and the second titanium oxide.

In one aspect of the above disclosure, a predetermined amount of phosphorus or a phosphorus containing compound may be added to the mixed powder.

In one aspect of the above disclosure, it is desirable to grind a spent denitration catalyst of honeycomb structure to obtain the spent denitration catalyst powder.

In one aspect of the above disclosure, a kneaded material obtained by kneading the mixed powder and a solvent may be applied on a plate-like substrate.

In one aspect of the above disclosure, the method for manufacturing a regenerated denitration catalyst may include a step of coating the surface of the kneaded material applied on the plate-like substrate with vanadium (including a vanadium compound) and at least one of molybdenum (including a molybdenum compound) or tungsten (including a tungsten compound).

The denitration apparatus according to the present disclosure includes an ammonia injection apparatus (22) that sprays an ammonia mixed gas in which ammonia gas and dilution air are mixed into a path through which a gas including nitrogen oxides flows; and the regenerated denitration catalyst for a denitration reaction (1, 10, 21) according to any of the above disclosures that is placed on the downstream side of the ammonia injection apparatus in the flow of the gas and that performs a denitration reaction with the gas and the ammonia mixed gas.

REFERENCE SIGNS LIST 1, 10, 21 regenerated denitration catalyst
2 plate-like substrate
3 catalyst layer
4 flat portion
5 line spacer portion
6 catalyst unit
7 unit frame
11 active layer
20 denitration apparatus
22 ammonia injection apparatus
23 ammonia gas line
24 dilution air supply line
25 valve
30 combustion gas production apparatus
31 heat exchanger
32 duct
33 combustion gas discharge line

The invention claimed is:

1. A method for manufacturing a regenerated denitration catalyst for a denitration reaction, the method comprising:
   using a mixed powder obtained by mixing a spent denitration catalyst powder comprising a first titanium oxide as a main component, and a second titanium oxide, and vanadium or a vanadium compound,
   the spent denitration catalyst powder being obtained by grinding a spent denitration catalyst of honeycomb structure,
   the spent denitration catalyst already being used in a denitration reaction in which nitrogen oxides in a gas are decomposed into nitrogen and water using a reducing agent, and
   the second titanium oxide having a larger specific surface area per unit weight than the first titanium oxide,
   the method further comprising:
   applying a kneaded mixture of the mixed powder and a solvent on a plate-like substrate and manufacturing a plate-like regenerated denitration catalyst not having honeycomb structure,
   wherein a content of vanadium or the vanadium compound is more than 0% by weight and 4% by weight or less based on a total weight of the regenerated denitration catalyst.

2. The method for manufacturing a regenerated denitration catalyst for a denitration reaction according to claim 1, wherein 10% by weight or more and 90% by weight or less of the second titanium oxide is mixed based on a total weight of the first titanium oxide and the second titanium oxide.

3. The method for manufacturing a regenerated denitration catalyst for a denitration reaction according to claim 1, wherein a predetermined amount of phosphorus or a phosphorus containing compound is added to the mixed powder.

4. The method for manufacturing a regenerated denitration catalyst for a denitration reaction according to claim 1, the method comprising a step of coating a surface of the kneaded material applied on the plate-like substrate with vanadium and at least one of molybdenum or tungsten.

5. The method for manufacturing a regenerated denitration catalyst for a denitration reaction according to claim 1, wherein a total weight of the first titanium oxide and the second titanium oxide based on a total weight of the regenerated denitration catalyst is in a range of 60% by weight to 85% by weight.

* * * * *